Jan. 5, 1965 HITOSI IYOI 3,164,099
TOOTHED PROFILES OF ROTORS OF GEAR PUMP
Filed July 31, 1962 3 Sheets-Sheet 1

INVENTOR.
HITOSI IYOI.
BY
ATTORNEY

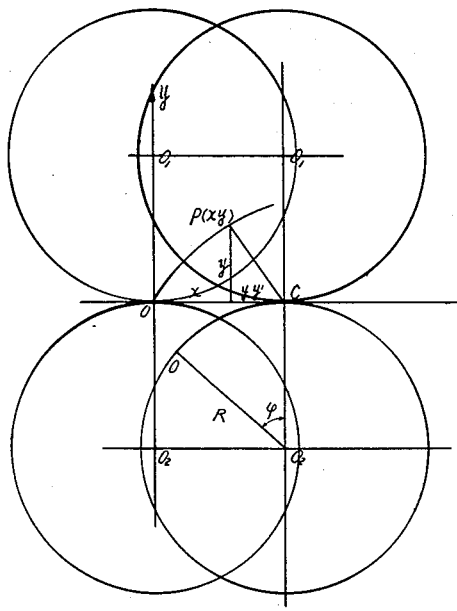
Fig. 10
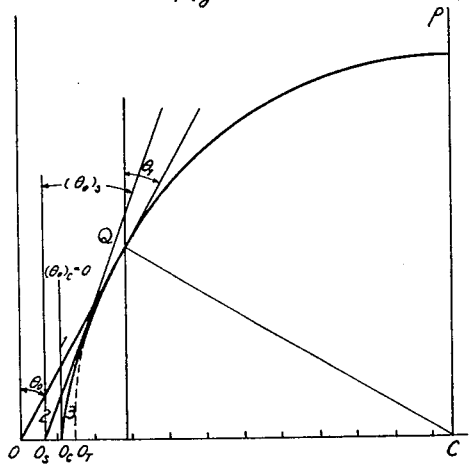
Fig. 11
Fig. 9
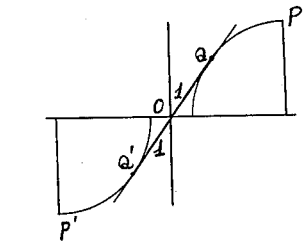
Fig. 12 (a)
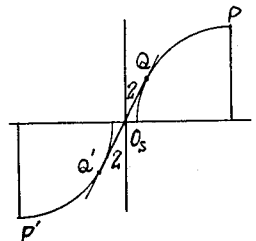
Fig. 12 (b)
INVENTOR.
HITOSI IYOI.
BY
ATTORNEY.

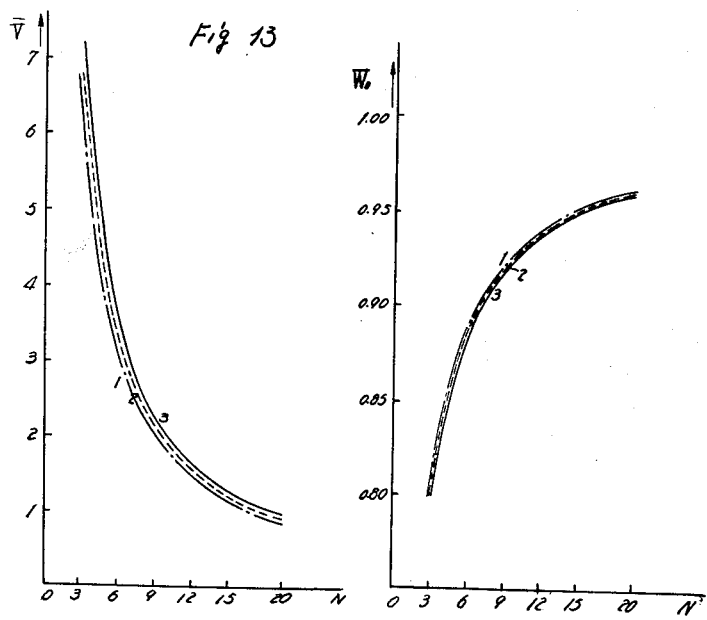
Fig 13
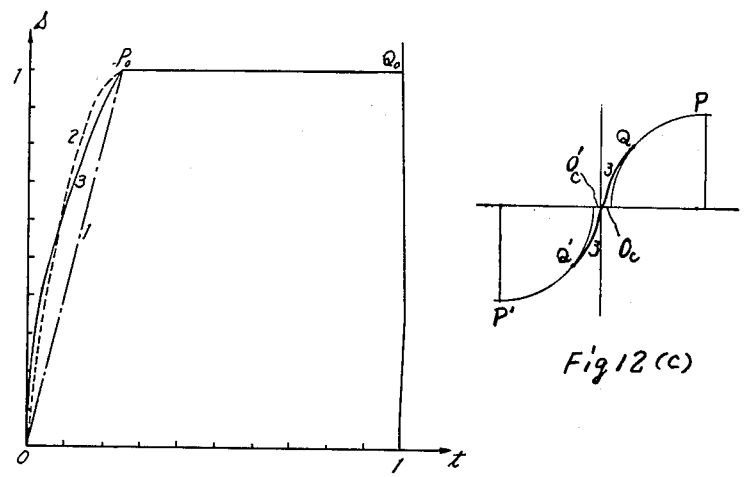
Fig 12(c)
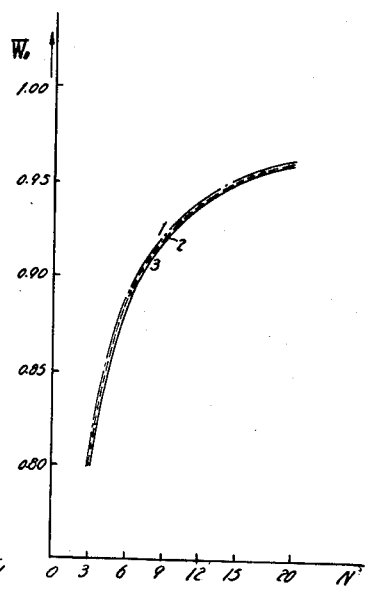
Fig 14
Fig 15
INVENTOR.
HITOSI IYOI United States Patent Office 3,164,099
Patented Jan. 5, 1965

3,164,099
TOOTHED PROFILES OF ROTORS OF GEAR PUMP
Hitosi Iyoi, 470 1–chome, Okubocho,
Narashino, Chiba, Japan
Filed July 31, 1962, Ser. No. 213,710
Claims priority, application Japan, Aug. 9, 1961,
36/28,703
3 Claims. (Cl. 103—128)

This invention relates to a gear pump; and has for one of its objects the improved efficiency of the pump by eliminating trapping of the pumped liquid and thereby reducing bearing load and preventing wear, chattering and noise of the gears during their pumping action, by an arrangement whereby the intermeshing teeth as they contact on one side of the tooth eliminate the pocket formed across the space between the teeth and yet the shape of a tooth is such that a driving action will be had from one gear to the other.

Another object of the invention is to secure uniform flow of fluid such as may be had with helical teeth and at the same time providing the minimum helical advance equalling the circular pitch to thus eliminate the time cyclic oscillations of delivery speed and torque.

Another and more specific object of this invention is to provide one of the most suitable forms to the teeth in the meaning that rotors having such form if teeth can be assured theoretically to have at the same time larger delivery rate and smaller specific slide than any other rotors having conventional tooth forms; in other words, the shape of considerable parts of the teeth covering the tip and the base is generated by or derived from an arc of a circle having its center on the pitch line and the rest of the tooth profile is generated by or derived from a certain curve drawn at a point on said circular arc, this point is selected in accordance with the amount of maximum meshing pressure angle in such a way that the amount of each meshing pressure angle corresponding to a point on this connecting curve decreases uniformity from the connecting point up to the pitch point. With these and other objects in view, the invention consists of certain novel features of construction, as will be more fully described, and particularly pointed out in the appended claims.

In the accompanying drawing:

FIG. 9 shows the calculated values of delivery rate.

FIG. 10 shows a diagrammatic view in the section perpendicular to the axis which indicates the meshing condition of rack and pinion.

FIG. 11 shows rack shapes in the section perpendicular to the axis, based on which hobs can be made.

FIG. 12(a), (b) and (c) are enlarged views of rack shapes illustrated in FIG. 11 to show clearly their connecting procedures.

FIG. 13 shows characteristic functions, based on which the present teeth profiles are formed theoretically.

FIG. 14 shows respective delivery rates of gear pumps having modified circular arcs.

FIG. 15 shows effective work corresponding to said pumps.

Figures 1, 2:
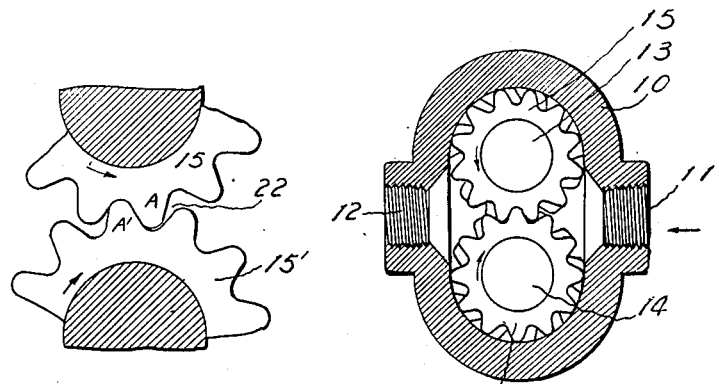
FIG. 1 is a sectional view through a gear pump.
FIG. 2 is a sectional view showing the intermeshing relation of the gear teeth in one position.
Figure 4:
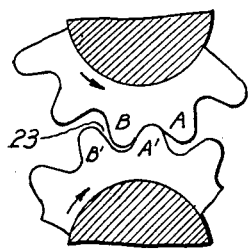
FIG. 4 is a similar view showing the gear teeth in a still different relative position.
Figure 3:
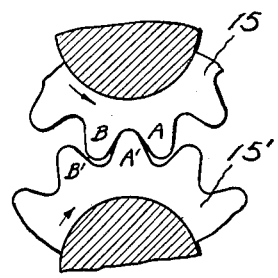
FIG. 3 is a view similar to FIG. 2 showing the gear teeth in a different relative position.
Figure 6:
FIG. 6 is a top plan view of one of the gears.
Figure 5:
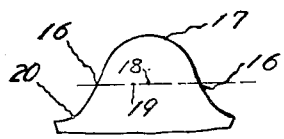
FIG. 5 is an enlarged somewhat diagrammatic view illustrating the shape of one of the gear teeth.

It can be demonstrated mathematically that, in case of spur type of gears, trapping does not occur when the continuity is anything less than one-half and conversely trapping does occur in proportion after the continuity exceeds one-half. Continuity may be defined as the property in conjugate teeth profiles whereby the driving tooth transmits power smoothly to the driven tooth, for instance, a continuity of 1.0 is that condition whereby the approaching teeth of the gear just forms contact at the instant the receding teeth of the pair break contact. In spur gears a continuity of not less than one is necessary for a continuous driving action. Further, it is known that where the spur type of gears are provided, although a pumping action occurs, relatively free from leakage through the gears, it gives an intermittent or pulsating displacement, and in order that the displacement may be continuous the teeth may be formed helically, and moreover it is clear that the minimum helical advance is equal to one-half the circular pitch for a form of ordinary continuous conjugate teeth in order to have continuous driving action and at the same time to eliminate cyclic perturbation of delivery speed but not enough for eliminating cyclic perturbation of torque during the pumping action, because delivery speed has a period of one-half the circular pitch, whereby torque has a period of an amount equalling to the circular pitch; therefore helical advance should be taken at least the common multiple of both, that is, the circular pitch itself, and the following is a more detailed description of the present embodiment of this invention by which these advantageous results may be accomplished: With reference to drawing, 10 designates the body or casing of a usual type of gear pump having an inlet opening 11 and a discharge opening 12, although the character of the rotor members which I employ enables these inlet and discharge openings to be reversed; that is, the inlet opening may be 12 and the discharge opening 11. A pair of shafts 13 and 14 are rotatably mounted in bearings in the casing and gears 15 and 15' of identical construction are mounted on these shafts in an intermeshing relation, such as shown in FIG. 1, and are of a character such that one may drive the other. Inasmuch as these gears are of identical formation, either shaft can be a driving shaft and the gear mounted thereon be a driving gear. The shape of all of the teeth on a section perpendicular to the axis of the tooth is the same and is shown in an enlarged form in FIG. 5. In order that the teeth of the driving gear may transmit driven movement to the teeth of the driven gear with which it intermeshes, a portion of the surface of this tooth can not be of arbitrary form. The section of said surface of both leading and trailing surfaces of the tooth is designated 16 in FIG. 5, and these surfaces on the opposite sides of each tooth are joined by the arc 17 of a circle which has a center 18 just on the pitch line 19 of the tooth. The surfaces 16 between adjacent teeth are joined by the arc of a circle 20 which has its center also just on the pitch line 19. By reason of this formation, the teeth of one gear will drive the teeth of the other gear and by reason of the fact that each gear is of identical formation, it is immaterial which gear is the driving gear and which gear the driven gear. Also, as the teeth are perfectly symmetrical with respect to a central radial line through the tooth, it is immaterial in which direction the gears are driven. This particular formation of teeth provides a continuity of only one-half and thus there will be no trapping of liquid as the gears rotate and intermesh one with the other. The relationship of the teeth in a profile at right angles to the axis of both shafts is as shown in one position in FIG. 2, in which the tooth A′ of gear 15′ is driving the tooth A of gear 15, there being a freedom of flow of the liquid from the space 22 as the meshing of the teeth takes place. The gears in further advanced position are shown in FIG. 3, in which the tooth A′ is between the teeth A and B of the gear 15, and these gears in a similar but more advanced relation are shown in FIG. 4. At no time does the space designated in FIG. 4 as 23 completely close and therefore there is no sealed pockets of the liquid formed to trap the liquid in a space between the teeth; and due to curved tips and roots of the teeth, each tooth has its maximum displacement the slightly greater radius at the base of the teeth with reference to the tip, providing a practical arrangement for manufacturing purposes to prevent binding and noise where the continuity is one-half or less, while no trapping occurs, if the spur type gear were so formed, there would be an intermittent transmission of drive from one gear to other as the continuity must be at least equal to 1.0 for continuous or uniform transmission of power; and to avoid this undesirable result the teeth have only to be formed helically with an advance across the face of the gear equal to one half the circular pitch. However, I have taken the circular pitch for the helical advance. The reason is as follows.

Delivery speed and torque are generally forced to oscillate periodically, that is the former has its period of one-half the circular pitch and the latter, the circular pitch. Therefore in order to eliminate at the same time said two perturbations, an amount of helical advance equalling to the common multiple of said two periods of oscillations should be taken. This is the circular pitch itself. In other words, helical advance of the circular pitch is not necessary, but sufficient for continuous or uniform driving action of gears, but necessary for eliminating at the same time oscillations of delivery speed and torque. In U.S. Pat. No. 2,159,744, helical advance is taken as one-half the circular pitch, minimum amount, so far as an even pumping action can be afforded, and yet trapping can be avoided, and this condition serves to eliminate the pulsating action of delivery speed, but not the oscillation of torque.

Figure 8:
FIG. 8 is a diagrammatic view showing a relation of pressures developed in the gears.
Figure 7:
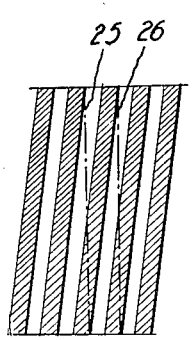
FIG. 7 is a diagrammatic sectional development of the gear teeth along the pitch line thereof.

I have shown in FIG. 7 somewhat diagrammatically a development along the pitch line of the gear. The advance is shown as the circular pitch, the pitch being designated by the perpendicular distance between the dot-dash lines 25, 26 with advance of the tooth across the face of the gear in the direction of the axis. The variations of pressure due to displacement of the liquid by one tooth entering between two other teeth will follow a curve such as represented at X in FIG. 8, in which the maximum and minimum lobes of the curve are one complement of the other, while at the same time where the teeth of the gears are given a helical advance in the amount stated of a circular pitch. The behavior of oscillations of delivery speed and torque is shown in FIG. 9 as the functions of rotational angle of rotors by the intermediary of a parameter of helical advance equalling to one half the circular pitch $\pi/N$.

Now I shall explain the content of the presently invented gear profile for the main specific object thereof.

Tooth profiles conventionally used are formed by trial methods, but not by orthodox ones. In more detail, according to the known gearing mechanism, two tooth profiles inter-meshing with each other, the path of contact point and the rack curve (rack curve means here the basic curve on which hob can be made) are equivalent in that when any one of them is determined, the other three will be fixed necessarily. In applying said mechanism any conventional tooth profiles are formed directly or indirectly, either by determining, to begin with, path of contact point or rack curve, then features original to the tooth profiles generated by or derived from said curves can be calculated by formulae. However, there has been lacking the principle of determining the form of such basic curve, that is path of contact point or rack curve which can satisfy the necessary conditions imposed upon the toothed rotors. I have succeeded in finding such principle from which I have invented one of the most suitable rack forms satisfying the following two conditions—1st, rotors having tooth profiles generated by or derived from said rack could have more delivery rate than those ever existing before—2nd, the above rotors produce or develop more output because of reduction in losses due to friction. It should be added that the above rack profile assures that rotors having tooth profiles generated by or derived therefrom contact each other in any instant at one point in the section perpendicular to the axis, therefore trapping can be avoided, and continuous driving action can be maintained by taking helical advance by an amount at least equal to the circular pitch (in this case continuity equalling to 1.5), and no leakage between the teeth, eliminating at the same time, oscillations of delivery speed and torque. Now I enter into a geometrical explanation of the present rack profile.

FIG. 10 shows rack shape (denoted by 1) in the section perpendicular to the axis, in taking x-axis as pitch line and y-axis, as the line joining two centers of axes $O_1$ and $O_2$. Denoting a point on rack curve by P $(x, y)$ where $x$ and $y$ are rectangular coordinates of the point P and the intersecting point of x-axis and normal line passing through the point P by C. With circle having the center at C and radius PC, it is clear that teeth profiles generated by or derived from said completely semi-circular rack do inevitably produce local interference at the connecting point (pitch point) therefore I use circular arcs as main parts of the two semi-circles having their centers on the pitch line and point Q is determined in correspondence with the amount of meshing pressure angle (angle formed by the tangent at point Q and y-axis), denoting this angle by $\theta_1$, I can determine the connecting curve passing through the point Q in the following manner. 1st, each meshing angle corresponding to a point of this curve decreases uniformly starting from point Q to the intersecting point with x-axis; this point is now taken as a new pitch point. In this case, I do not have to take care of the amount of meshing angle along the circular arc, because specific slide is equal to zero on said arc.

FIG. 11 shows curve QOs and QOc, for example, where QOs represents sine curve and QOc, cycloid, while QO is a segment passing through Q and all these curves have common tangents with circular arc at point Q.

The last rack profile $OQ+QP$ is obtained on purely theoretical basis on the following conditions: the rack height i.e. tooth height attains maximum value and consequently delivery rate attains maximum value, assuming that cutting pressure angle (angle between y-axis and tangent of hob curve at pitch point) is given. But teeth profiles generated by or derived from said rack have two drawbacks. 1st, radius of curvature at the connecting point Q is not continuous therefore specific slide is not, either. 2nd, least number of teeth (denoted by No) is not so small where No means the number of teeth; for any number of teeth less than No, tooth profiles intermeshing with each other produce local interferences. By improving said two points, said curves OsQ or OcQ are obtained. Now connecting procedures of these rack curves at their pitch points O, Os or Oc are discussed. Special care should be taken as follows. In FIG. 12 (2)(b), curves PQOQ′P′ and PQOsQ′P′ are shown as the sum of the symmetrical figures concerning their pitch points O and Os; however in FIG. 12 (C), since curve PQOc has its cutting pressure angle equalling to zero at point Oc, local interferences should take place inevitably at pitch point if Oc is taken as its pitch point, therefore in practical problems two symmetrical curves PQOc and P′Q′Oc should not be joined directly at point Oc and suitable connecting procedure should be performed not to give rise to such undesirable result. (See FIG. 12 (C).)

In FIG. 11, $Q_T$ is the intersecting point of x-axis and the circle having its center on a point C of x-axis and its radius Pc. The connecting procedure consists in the fact that the intersecting point of the connecting part of rack curve and x-axis be situated between the points O and $O_T$.

Curve QOc, cycloid passing through the point Q and having not only common tangent at Q, but also common radius of curvature, curve QOs has similar behaviour at point Q, and the difference between these two consists in the fact that 1st, cutting pressure angle has positive value for QOs, but zero for QOc, 2nd the curve QOs approaches Q more naturally to the initial circular arc than the curve QOc. This is evident in FIG. 13 which represents their characteristic functions to determine uniquely the corresponding rack curve; therefore tooth profiles are derived from or generated thereby.

In FIG. 14, V (delivery rate) 2 (which corresponds to rack form PQOs) shows relatively as large a value as 3 (which corresponds to rack PQOc) in comparison with that of 1. This is foreseen in s–t diagram. QOs can be replaced by another curve and QOc can be so, for example, by rack curve represented by the equation.

FIG. 15 shows effective works of gear pumps having said three modified circular arc tooth profiles.

In summing up the present formation of tooth profiles from the view point of mathematics and gearing mechanism, the following description would be desirable to be added.

In reference to FIG. 10, assume $\varphi$ be rotational angle of rotors and R be common radius of pitch circle, and x, y be rectangular coordinates of an arbitrary point Q on rack curve. Then rectilinear advance of rack on its pitch line, $x+yy'$, should be equal to the distance of rotors along the pitch circle $\varphi R$; therefore meshing condition is given by (1)

$$\varphi R = x + yy' \quad (1)$$

differentiating (1) with respect to x, and $R \, d\varphi/dx$ is regarded as a function of y, denoting $$R \, d\varphi/dx = X(y) \text{ and } dy/dx = y', \, d^2y/dx^2 = y''$$

I have:

$$1 + y'^2 + y = X(y) \quad (2)$$

In solving (2) with respect to $y'$, I obtain:

$$y'^2 = \frac{2\int_0^y yX(y)\,dy}{y^2} - 1 + \frac{C}{y^2} \quad (3)$$

where C is the integral constant. Condition of non local interferences or of continuous contact of two rotors is given separately by (4), (5) and (6)

for a pitch point:

$$\lim_{y \to 0} yy' = 0 \quad (4)$$

for a tip and a base:

$$\lim_{y \to 1} y' = 0 \quad (5)$$

here tooth height is taken as a unit.

Condition of non local interferences for other parts excluding a tip, a base and a pitch point is given by:

$$|yX(y)| \leq R \quad (6)$$

from (3), in using (4), we have:

(i) $Qo > 0$ for $C = 0$ ($Qo$: cutting pressure angle)

(ii) $Qo = 0$ for $C < 0$ (iii) non-existence of rack, and of tooth profile for $C < 0$ said connecting curves OQ and OsQ belongs to (i)

OcQ to (ii)

Equation of rack curve is obtained in integrating once more the Equation 3 with respect to x.

By denoting distance of a contact point of two rotors from a pitch point as r, I have:

$$r^2 = y^2(1+y'^2) = 2\int_0^y yX(y)\,dy$$

denoting furthermore $y^2 = t$, I have:

$$r^2 = \int X(\sqrt{t})\,dt = \varphi(t) = s$$

say then, in case (i) where $C = 0$, I have from (3):

$$y'^2 = \frac{s}{t} - 1 \geq 0, \text{ or } s \geq t$$

I can conclude that any tooth profile which has a given positive value cutting pressure angle $Oo$ should be inscribed in a triangle OPQ seen in s–t diagram represented by FIG. 13.

$OQ + QP$ produces rack curve: segment+circular arc, the center of which is located on pitch line.

Once PQ is determined, I can find out a suitable curve to connect two points Q and O; then rotors having tooth profiles generated by or derived from said curve should have larger delivery and larger effective work in taking account of friction loss than the ones existing ever before. As the specific slide is proved mathematically to be a function of yX(7) or X(y) and when X(y) is equal to zero, specific slide becomes necessarily zero; this is one of the reasons why I take for the considerable part of the rack or of the tooth profile an arc of a circle, its center being located just on the pitch line.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a gear pump, intermeshing helical toothed gears, the respective helical teeth of the gears having an angle of advance on the face of the gears equal to the circular pitch of the teeth and a continuity to provide a continuous driving action between the engaging teeth, the flanks of each tooth being involute and the tip and base of each tooth being an arc of a circle with the center of the arc being on the pitch circle.

2. In a gear pump, intermeshing helical toothed gears, the respective helical teeth of the gears having an angle of advance on the face of the gears equal to the circular pitch of the teeth and a continuity to provide a continuous driving action between the engaging teeth, the flanks of each tooth being a cycloid and the tips and base being an arc of a circle with the center of the arc being on the pitch circle.

3. In a gear pump, intermeshing helical toothed gears, the respective helical teeth of the gears having an angle of advance on the face and on the base of the gears equal to the circular pitch of the teeth, the flank of each tooth is defined by a curve having an intersecting point on the pitch line between two points, one of said two points being the intersecting point of an involute and the pitch line and the other of said two points the intersecting point of semi-circle having its center on the pitch line, and the flanks along the leading and trailing faces extending at both sides of the pitch line with the tips and bases of each tooth connected to the flanks by surfaces which are arcs of a circle centered on the pitch line.

References Cited in the file of this patent

UNITED STATES PATENTS

| | | |
|---|---|---|
| 294,026 | Fitts | Feb. 26, 1884 |
| 325,276 | Roots | Sept. 1, 1885 |
| 1,923,268 | Jensen | Aug. 22, 1933 |
| 1,976,227 | Howard | Oct. 9, 1934 |
| 2,040,754 | McLeod | May 12, 1936 |
| 2,159,744 | Maglott | May 23, 1939 |
| 2,293,126 | Fersing | Aug. 18, 1942 |
| 2,447,104 | Trbojevich | Aug. 17, 1948 |
| 2,604,051 | Johnson | July 22, 1952 |
| 2,994,230 | Haberland et al. | Aug. 1, 1961 |

FOREIGN PATENTS

| | | |
|---|---|---|
| 439,908 | Great Britain | Dec. 17, 1935 |
| 578,809 | Great Britain | July 12, 1946 |